Nov. 3, 1942.　　　H. E. SPOONER　　　2,300,834
EYEGLASS CONSTRUCTION
Filed April 19, 1940　　　2 Sheets-Sheet 1
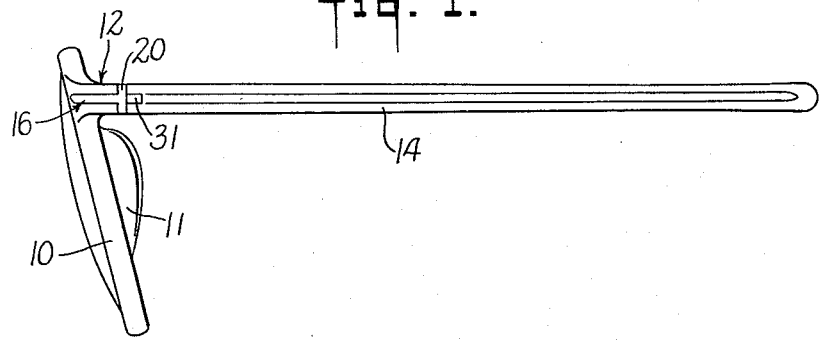
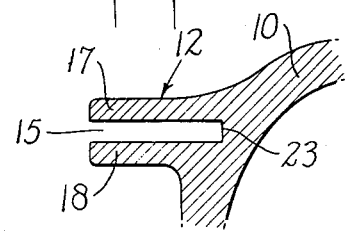
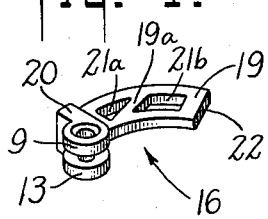
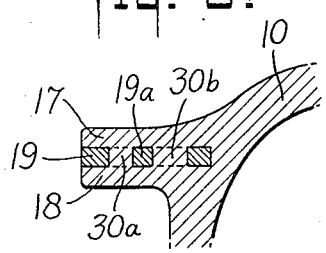
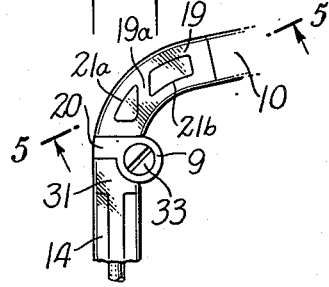
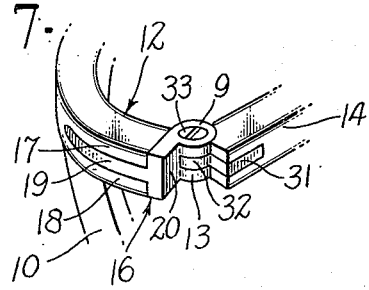
INVENTOR
*Howard E. Spooner*
BY
*Blair, Curtis & Hayward*
ATTORNEYS Nov. 3, 1942.   H. E. SPOONER   2,300,834
EYEGLASS CONSTRUCTION
Filed April 19, 1940   2 Sheets-Sheet 2

INVENTOR
Howard E. Spooner
BY
Blair, Curtis & Hayward
ATTORNEYS

Patented Nov. 3, 1942

2,300,834

UNITED STATES PATENT OFFICE 2,300,834

EYEGLASS CONSTRUCTION

Howard E. Spooner, Attleboro, Mass., assignor to Bay State Optical Company, Attleboro, Mass., a corporation of Maine Application April 19, 1940, Serial No. 330,447

4 Claims. (Cl. 18—59)

This invention relates to non-metallic eyeglass frame construction and to a method of connecting metal parts thereto.

One of the objects of this invention is to provide an eyeglass construction which will be neat and attractive in appearance. Another object is to provide a construction of the above character which may be easily manufactured with a minimum amount of labor and from inexpensive materials. Another object is to provide a construction of the above character which will be simple, practical, and thoroughly durable. Another object is to provide a construction of the above character in which the rim and temple connection may be easily and quickly assembled. Another object is to provide a construction of the above character wherein the metallic parts are concealed to a great extent to give a pleasing effect. Another object is to provide a construction of the above character wherein the metal parts are reliably secured to the plastic material. Another object is to provide a practical and efficient method of securing metallic parts to non-metallic frames. Other objects will be in part obvious and in part pointed out hereinafter.

The invention accordingly consists in the features of construction, combinations of elements, and arrangements of parts, and in the several steps and order of each of the same to one or more of the others, all as will be illustratively described herein, and the scope of the application of which will be indicated in the following claims.

In the accompanying drawings in which are shown one or more of the various possible embodiments of my invention, Figure 1 is a side elevation of an eyeglass frame having the features of my invention embodied therein;

Figure 2 is a vertical sectional view, on an enlarged scale, of a portion of the frame prior to assembly;

Figure 3 is a perspective view of inserts which become portions of the frame during assembly;

Figure 4 is a perspective view, on an enlarged scale, of a metallic fitting used in the frame;

Figure 5 is a vertical sectional view taken along the line 5—5 of Figure 6;

Figure 6 is a top plan view, on an enlarged scale, of a portion of the frame shown in Figure 1;

Figure 7 is a fragmentary perspective view, on an enlarged scale, of a portion of the frame shown in Figure 1;

Similar reference characters refer to similar parts throughout the several views of the drawings.

Figure 8:
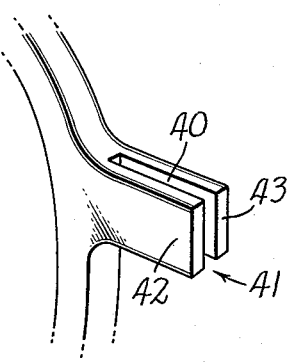
Figure 8 is a perspective view of another embodiment of my invention showing a portion of an eyeglass frame before assembly.

As conducive to a clearer understanding of certain features of this invention, it might here be pointed out that in making eyeglass frames formed from a non-metallic material, such as zylonite or the like, it is necessary to secure metallic parts thereto at various points. This necessity arises from the fact that plastic materials are not strong enough to perform certain functions, such as forming the hinge connection between the temple and the frame to which it is attached. Plastic materials are usually partially or completely transparent so that the parts forming the connection can be easily seen; thus, in the past, the bulkiness of the structure and the manner of attaching metallic fittings to non-metallic frames detracted from the appearance of the frame. Further, difficulty has been experienced in connecting the metallic parts to the frame and the temple so that they will withstand the strains encountered in use. One of the objects of this invention is to provide a construction and a method which overcome the above difficulties, as well as many others.

It might here be noted that reference hereinafter to an "outward" direction signifies a direction to the left or right of the bridge of an eyeglass frame in the direction of the temples, while the term "inward" denotes a direction opposite thereto. A "rearward" direction refers to a direction toward the face of the wearer, whereas the term "forward" denotes the opposite direction. An "upward" direction refers to a direction upwardly from the face of the wearer, while a "downward" direction is opposite thereto.

Referring now to Figure 1, in which a side elevation of a non-metallic eyeglass frame is shown, rim 10 has a nose guard 11 and a preferably integral endpiece 12 formed thereon. Endpiece 12 is curved outwardly and rearwardly (see also Figure 7) and is connected by a metallic fitting, generally indicated at 16, to a temple 14.

In Figure 2, endpiece 12 is shown before its connection to metallic fitting 16. The endpiece is provided with a slot 15, which is substantially in a horizontal plane with respect to the normal position of the frame when worn, and which makes endpiece 12 comprise two horizontally disposed tongues 17 and 18.

Referring now to Figure 4, metallic fitting 16 includes a curved flat tongue portion 19 having substantially the same thickness, width, and shape as slot 15. On the outer end of fitting 16 is provided a cover portion 20, which, when tongue portion 19 is within slot 15 (Figure 7), covers the outer end of endpiece 12 (see also Figure 6). As best seen in Figures 4 and 6, tongue portion 19 has a pair of openings 21a and 21b extending therethrough in its central section which are separated by a rib 19a. Rib 19a is preferably perpendicular to cover portion 20 and serves a purpose which will be more fully described hereinafter.

Openings 21a and 21b are adapted to snugly receive inserts 30a and 30b (Figure 3) of plastic material, such as zylonite, which have substantially the same dimensions as these openings. To connect fitting 16 to endpiece 12, zylonite inserts 30a and 30b are placed in openings 21a and 21b, and both the tongue portion 19 and the exposed surfaces of inserts 30a and 30b are coated with a priming lacquer having a cellulose base, which is allowed to dry. Then, a zylonite solvent, such as ethyl acetate, is applied to tongue portion 19, the exposed surfaces of inserts 30a and 30b, and the sides of slot 15. When this solvent has reduced the zylonite and lacquer surfaces to which it was applied to a fusible state, the tongue portion 19 with inserts 30a and 30b therein is placed in slot 15 between tongues 17 and 18.

When fitting 16 is properly positioned with respect to endpiece 12 with the end 22 of tongue portion 19 abutting the surface 23 at the end of slot 15, the tongues 17 and 18 are pressed together against tongue portion 19 and inserts 30a and 30b. This forces the surfaces of the parts coated with solvent into contact with each other, and they fuse together as the solvent evaporates. Inserts 30a and 30b become an integral part of tongues 17 and 18, and the zylonite surfaces contacting fitting 16 are secured thereto by fusing to the layer of lacquer covering the fitting.

Thus, integral portions of endpiece 12 extend through fitting 16, firmly locking fitting 16 thereto. Furthermore, the main portion of fitting 16 is hidden from view in the interior of the endpiece if the frame is made from a nontransparent plastic, while, if the frame is made from a transparent plastic, the fitting is small and free of protruding portions. Thus fitting 16 is secured to endpiece 12 by a strong connection which, at the same time, is neat and attractive in appearance.

Referring now to Figures 1, 6, and 7, temple 14 is preferably made of a plastic material, such as zylonite, and has a metallic rod extending longitudinally thereof in its center. A cover member 31 is connected to the exposed end of this rod, having an ear 32 formed thereon. Ear 32 is adapted to fit between a pair of ears 9 and 13 formed on fitting 16, and a screw is passed through these ears to form a hinged connection between the temple and fitting 16. Ears 9, 13, and 32 are positioned so that the center of screw 33, which forms the axis of the hinge, is in alignment with the inside (right side in Figure 6) of temple 14. As the temple hinges about this axis, its movement in an outward direction (clockwise in Figure 6) is limited by cover member 31 abutting against cover member 20.

When the frame is in use, strains upon the connection of the fitting to the frame are exerted by upward, downward, and outward movements of the temples. When a temple is moved upwardly or downwardly, it is important that the tongue portion 19 have substantial bearing surfaces contacting the abutting surfaces of the tongues 17 and 18. Rib 19a, which is in substantial alignment with screw 33, serves this purpose in that it forms a material part of the top and bottom bearing surfaces of the fitting.

The integral columns of plastic material which extend through openings 21a and 21b bear the brunt of strain when the temple is twisted in an outward direction. However, these columns are of substantial size, and the frame is bonded to all contacting surfaces of the fitting as described hereinabove. Thus the integral columns extending through the fitting and the bond between the fitting and the frame are designed to absorb strains resulting from such movement.

Thus, I have provided a strong and reliable connection between temple 14 and endpiece 12 which is neat and attractive in appearance. I have also demonstrated a method by which this connection may be practically and efficiently made. Furthermore, metal parts comprising this connection are attached to the temple and endpiece in such a manner as to be able to withstand hard usage.

Figure 13:
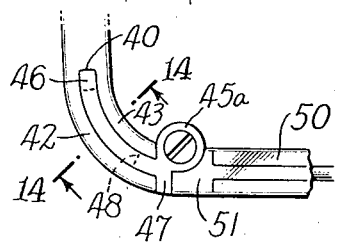
Figure 13 is a top plan view of the end portion of the frame as assembled.
Figure 14:
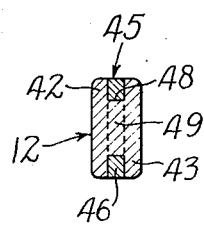
Figure 14 is a vertical sectional view taken along the line 14—14 of Figure 13.
Figure 15:
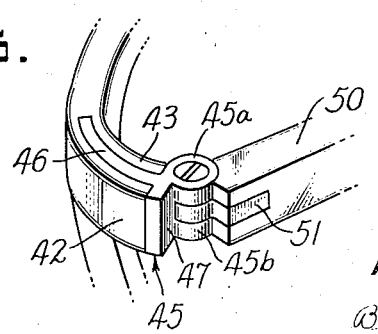
Figure 15 is a fragmentary perspective view of the end portion of the frame as assembled.

Referring now to Figures 8 through 15, an embodiment of the invention is shown in which the tongue of a metallic fitting is secured to a non-metallic endpiece in a vertical plane with respect to the normal position of the frame when worn. Figures 13, 14, and 15 show details of an assembled fitting, while Figures 8 to 12 show the elements which are used in constructing this embodiment. The metallic fitting shown in Figure 12, and generally indicated at 45, includes a tongue 46, a cover 47 and a pair of ears 45a and 45b. Tongue 46 is provided with an elongated opening 48, into which is snugly received the plastic insert 49 (see Figure 11).

Figure 9:
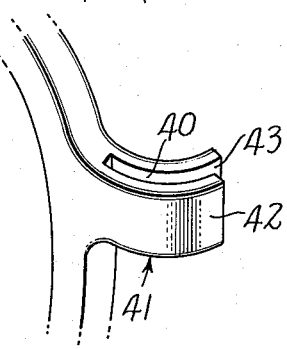
Figure 9 is a perspective view of the portion of a frame shown in Figure 8 with the shape of certain parts altered prior to assembly.
Figure 10:
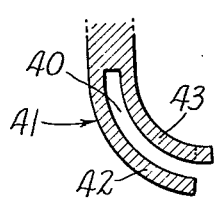
Figure 10 is a horizontal sectional view through the portion of the frame shown in Figure 9.
Figure 11:
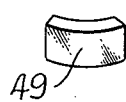
Figure 11 is a perspective view of an insert which becomes a portion of the frame during assembly.
Figure 12:
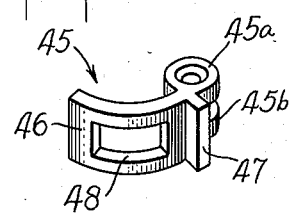
Figure 12 is a perspective view of a fitting used in the frame.

In assembling this embodiment of the invention, the first step is to provide the construction shown in Figure 8 wherein the endpiece generally indicated at 41 is cut along a vertical plane, thereby providing a slot 40 and forming a pair of tongue portions 42 and 43. Next, tongue portions 42 and 43 are heated and bent rearwardly to form concentric arcs as shown in Figures 9 and 10. During this bending operation, the end of tongue portion 43 extends rearwardly beyond the end of tongue portion 42 (see Figure 10). Accordingly, these tongue portions are cut off even along the dotted lines so that in assembly they lie flat against the respective surfaces of metallic fitting 45.

Tongue 46 of metallic fitting 45 has substantially the same curvature as endpiece 41, and is snugly received in slot 40 with the plastic insert 49 positioned in opening 48. During assembly, metallic tongue 46 is coated with a cellulose lacquer, and insert 49 is placed in opening 48, after which endpiece 41, insert 49, and tongue 46 are coated with a plastic solvent, such as ethyl acetate. Next, the tongue and insert are placed in slot 40 between tongue portions 42 and 43, and the tongue portions are pressed together until the solvent evaporates. This securely bonds insert 49 and tongue 46 to the sides of slot 40 (Figures 13 and 14) with insert 49 becoming an integral part of the endpiece. Cover member 47 covers the exposed ends of tongue portions 42 and 43, and ears 45a and 45b form a hinged connection with a metallic fitting 51 which is secured to temple 50 in any suitable manner, such as referred to above.

In constructing frames of these embodiments, non-metallic frames are cut in the form of flat blanks from sheets of plastic material, and, if it is desired to have the endpieces curve rearwardly, they are heated and bent to the correct shape and then allowed to cool. However, in the case of extended use or if the endpieces become heated, they tend to straighten and return to the plane from which they were bent. In the constructions disclosed, this tendency is overcome by the action of the plastic inserts. The tongue portions are bent out of the planes in which they lie, and, due to the fact that they are bent along different arcs, one tongue portion extends rearwardly a greater distance than the other. Then, when the two tongue portions are bonded together in this bent position by the insert, the tongue portions hold each other rigidly. Thus they cannot straighten out, as such action would cause either the compression and shortening of tongue portion 42 or the stretching and lengthening of tongue portion 43. In this manner, a strong and durable connection has been disclosed for connecting a metallic fitting to a non-metallic endpiece, and a method of formation of a curved endpiece is disclosed which results in the formation of an endpiece which does not straighten under extended use. It will thus be seen that I have provided a thoroughly practical and efficient construction in which the several objects hereinabove referred to, as well as many others, are successfully accomplished.

As many possible embodiments may be made of the mechanical features of the above invention, and as the art herein described may be varied in various parts, all without departing from the scope of the invention, it is to be understood that all matter hereinabove set forth or shown in the accompanying drawings is to be interpreted as illustrative and not in a limiting sense.

I claim:

1. The herein described art of attaching a metallic part to an eyeglass frame formed of a plastic material, which includes the steps of forming a slot in said frame, forming an opening in said part, forming a block of plastic material of substantially the same size as said opening and of substantially the same thickness as said part, inserting said block in said opening until its sides are flush with the sides of said part, lacquering the opposite sides of said part and said block, drying said lacquer, applying a solvent to said lacquered sides, and inserting said part in said block in said slot.

2. The herein described art of attaching a metallic part to an eyeglass frame formed of a plastic material, which includes the steps of forming a slot in said frame, forming an opening in said part, forming a block of plastic material of substantially the same size as said opening and of substantially the same thickness as said part, inserting said block in said opening until its sides are flush with the sides of said part, lacquering the opposite sides of said part and said block, drying said lacquer, applying a solvent to said lacquered sides, inserting said part and said block in said slot, and applying pressure to said frame adjacent said slot to force the sides of said slot against the inserted metal part and block.

3. The herein described art which includes the steps of forming an eyeglass frame with an endpiece thereon from a flat sheet of plastic material, forming a slot in said endpiece, applying heat and pressure to said endpiece to bend said endpiece rearwardly of said frame, forming a block of plastic material of the general shape of said slot, inserting said block of plastic material in said slot, and joining the sides of said block to the sides of said slot to hold said endpiece to the shape it is bent.

4. The herein described art which includes the steps of forming an eyeglass frame with an endpiece thereon from a flat sheet of plastic material, forming a slot in said endpiece, applying heat and pressure to said endpiece to bend said endpiece rearwardly of said frame, forming a metallic member having the same shape and thickness as said slot, forming an elongated opening in said metallic member, forming a block of plastic material of a size to fill the opening in said metallic member, inserting said block of plastic material in said opening, and joining the sides of said block to the sides of said slot to hold said endpiece to the shape it is bent.

HOWARD E. SPOONER.